United States Patent
Riley et al.

(10) Patent No.: US 9,423,505 B2
(45) Date of Patent: Aug. 23, 2016

(54) RECOVERY FROM POSITION AND TIME OUTLIERS IN POSITIONING

(75) Inventors: Wyatt Thomas Riley, Chesterbrook, PA (US); Lalitaprasad V. Daita, San Jose, CA (US); William James Morrison, San Francisco, CA (US); Dominic Gerard Farmer, Los Gatos, CA (US); Jie Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 928 days.

(21) Appl. No.: 13/325,649

(22) Filed: Dec. 14, 2011

(65) Prior Publication Data

US 2012/0182182 A1    Jul. 19, 2012

Related U.S. Application Data

(60) Provisional application No. 61/423,412, filed on Dec. 15, 2010.

(51) Int. Cl.
| G01S 19/45 | (2010.01) |
| G01S 19/20 | (2010.01) |
| G01S 19/25 | (2010.01) |

(52) U.S. Cl.
CPC ............ *G01S 19/20* (2013.01); *G01S 19/25* (2013.01); *G01S 19/45* (2013.01)

(58) Field of Classification Search
CPC .......... G01S 19/45; G01S 19/29; G01S 19/25
USPC ....................................... 342/357.58, 357.28
See application file for complete search history.

(56) References Cited

U.S. PATENT DOCUMENTS

| 6,556,832 | B1* | 4/2003 | Soliman ................ H04W 16/18 342/357.31 |
| 6,839,020 | B2 | 1/2005 | Geier et al. |
| 7,064,706 | B2 | 6/2006 | King et al. |
| 7,170,447 | B2 | 1/2007 | Riley et al. |
| 7,501,981 | B2 | 3/2009 | Rahman et al. |
| 2002/0132626 | A1 | 9/2002 | Tsunehara et al. |

(Continued)

FOREIGN PATENT DOCUMENTS

| CN | 101057156 A | 10/2007 |
| CN | 101142495 A | 3/2008 |

(Continued)

OTHER PUBLICATIONS

International Search Report and Written Opinion—PCT/US2011/065096—ISA/EPO—May 15, 2012.

(Continued)

*Primary Examiner* — Frank J McGue
(74) *Attorney, Agent, or Firm* — Berkeley Law & Technology Group, LLP

(57) ABSTRACT

A mobile device may use one or more outlier detectors to detect likelihoods that an outlier condition exists for a satellite positioning system (SPS) position fix. In some implementations, an outlier detector may compare a computed position fix to an element of assistance data to generate an outlier likelihood. A decision to perform a recovery operation may be made based, at least in part, on a generated outlier likelihood. In some implementations, a computed reliability of the position fix may also be considered in making a recovery decision.

25 Claims, 6 Drawing Sheets

(56) References Cited

U.S. PATENT DOCUMENTS

| | | | |
|---|---|---|---|
| 2005/0055160 A1 | 3/2005 | King | |
| 2005/0104772 A1* | 5/2005 | Diggelen et al. | 342/357.02 |
| 2006/0290566 A1* | 12/2006 | Syrjarinne et al. | 342/357.15 |
| 2007/0156329 A1* | 7/2007 | Komatsu | 701/201 |
| 2007/0200752 A1* | 8/2007 | van Diggelen et al. | 342/357.01 |
| 2010/0149030 A1* | 6/2010 | Verma et al. | 342/357.09 |
| 2010/0238070 A1* | 9/2010 | Harper et al. | 342/357.46 |
| 2011/0102251 A1 | 5/2011 | Morrison | |

FOREIGN PATENT DOCUMENTS

| | | |
|---|---|---|
| CN | 101305293 A | 11/2008 |
| JP | 2002281540 A | 9/2002 |
| JP | 2006203861 A | 8/2006 |
| JP | 2007511766 A | 5/2007 |
| JP | 2008249555 A | 10/2008 |
| JP | 2010169554 A | 8/2010 |
| JP | 2010266402 A | 11/2010 |
| JP | 2010276411 A | 12/2010 |
| WO | WO-2004075016 A2 | 9/2004 |
| WO | 2006060074 A2 | 6/2006 |

OTHER PUBLICATIONS

Notice of Decision of Rejection for JP2013544768 with English translation, received Jan. 15, 2016, 7 pages.

* cited by examiner

RECOVERY FROM POSITION AND TIME OUTLIERS IN POSITIONING

CLAIM OF PRIORITY UNDER 35 U.S.C. 119

This application claims priority under 35 USC 119 to U.S. Provisional Application Ser. No. 61/423,412, filed Dec. 15, 2010, and entitled, "RECOVERY FROM POSITION AND TIME OUTLIERS IN POSITIONING", which is assigned to the assignee hereof and which is incorporated herein by reference.

BACKGROUND

1. Field

Subject matter disclosed herein relates generally to positioning and, more particularly, to recovery from errors occurring in a process for obtaining a position fix.

2. Information

Satellite positioning systems (SPSs), such as the Global Positioning System (GPS) and the like, have enabled SPS receivers on mobile devices to generate position estimates for the mobile devices by processing signals received from transmitters aboard space vehicles ("SPS signals"). A position estimate generated by an SPS receiver may be referred to as a position fix. Typically, an SPS receiver will acquire SPS signals from four or more satellites of an SPS to generate a position fix. The SPS receiver may use these SPS signals to estimate distances (i.e., pseudoranges) to the four or more satellites. The pseudoranges may then be used, along with knowledge about the locations of the satellites, to generate the position fix for the mobile device.

When a position fix is desired, an SPS receiver of a mobile device may perform a search for SPS signals being received from space. If the SPS receiver has no knowledge of its current position or the current position of satellites of the SPS, this search may entail a full sky scan (which may be referred to herein as performing a search from a cold start) to acquire the satellites, which can be a very complex process. Because of its complexity, attempting to search for and acquire satellites from a cold start can consume significant energy and thus reduce battery life for a mobile device having an SPS receiver. In addition, in mobile devices having limited processing power, searching for SPS signals from a cold start can be very time consuming and thus delay the generation of the position fix. An untimely or delayed position fix may negatively impact applications which rely on position knowledge.

In some systems, assistance data may be used by an SPS receiver to reduce the complexity of the search for SPS signals. If assistance data is used, an SPS position fix may be achieved more quickly and with less power consumption. By reducing power consumption, battery life may be extended. Assistance data may include, for example, a rough estimate of a current location of a mobile device, an estimate of SPS time, Doppler search window information, almanac and/or ephemeris data, as well as other forms of information. This assistance data may be obtained from various sources including, for example, a remote location server accessible through a wireless communication network, a wireless base station or access point associated with wireless communication network, information stored within the mobile device itself, and/or other sources.

While assistance data may allow a position fix to be obtained more quickly and with less energy expenditure, sometimes assistance data may be inaccurate or erroneous. As will be appreciated, the use of faulty assistance data can negatively impact the accuracy of a resulting position fix. In addition, it is often difficult to determine the accuracy of assistance data before the data is used. Any resulting errors in a position fix, therefore, may not be detected until one or more location-based applications that use the position fix data malfunctions. It would be desirable to have techniques and structures that are capable of identifying and recovering from position fix errors in a more timely and/or efficient manner.

BRIEF DESCRIPTION OF THE FIGURES

Non-limiting and non-exhaustive implementations will be described with reference to the following figures, wherein like reference numerals refer to like parts throughout the various figures unless otherwise specified.

SUMMARY

Figure 1:
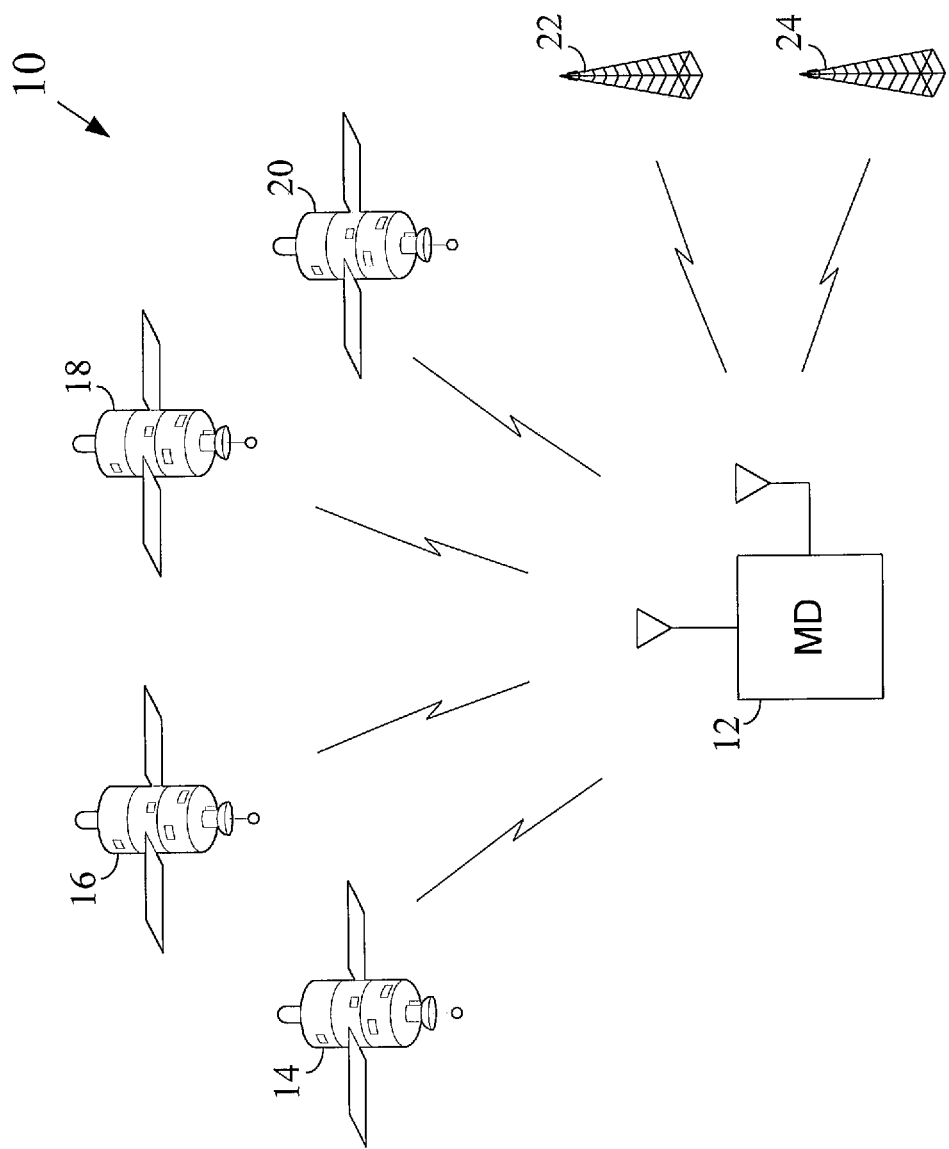
FIG. 1 is a schematic diagram illustrating an example communication arrangement that may incorporate features, structures, or techniques described herein in one or more implementations.

In some implementations, a machine implemented method comprises: detecting an erroneous condition responsive to a determination of fitness of an estimated location of a mobile device computed based, at least in part, on an initial position; and in response to the detection of the erroneous condition, restarting a process at the mobile device to obtain a position fix independently of the initial position and the computed location estimate.

In other implementations, an apparatus comprises: a satellite positioning system (SPS) receiver to: acquire SPS signals from positioning satellites and compute an estimated location of the apparatus using the acquired SPS signals; and a processor to: detect an erroneous condition responsive to a determination of fitness of an estimated location of the apparatus based, at least in part, on an initial position, and restart a process at the apparatus to obtain a position fix independently of the initial position and the computed location estimate in response to the detection of the erroneous condition.

In certain implementations, an apparatus comprises: a digital storage medium having instructions stored thereon executable by a computing system to: detect an erroneous condition responsive to a determination of fitness of an estimated location of a mobile device computed based, at least in part, on an initial position; and in response to the detection of the erroneous condition, restart a process at the mobile device to obtain a position fix independently of the initial position and the computed location estimate.

In various implementations, an apparatus comprises: means for detecting an erroneous condition responsive to a determination of fitness of an estimated location of a mobile device computed based, at least in part, on an initial position; and means to restart a process at the mobile device to obtain a position fix independently of the initial position and the computed location estimate in response to the detection of the erroneous condition.

In other implementations, a machine implemented method comprises: checking a position fix of a satellite positioning system (SPS) receiver for consistency with assistance data used to generate the position fix; and determining whether to generate a new position fix using less than all of the assistance data based, at least in part, on results of the checking the position fix.

In still other implementations, an apparatus comprises: a satellite positioning system (SPS) receiver to: acquire positioning satellites using assistance data, compute a position fix using SPS signals received from acquired satellites, and calculate a reliability of the position fix; a plurality of outlier detectors to compare the position fix to elements of the assistance data to generate outlier likelihood information; and a recovery manager to determine whether to instruct the SPS receiver to compute a new position fix using less than all of the assistance data based, at least in part, on the reliability of the position fix and the outlier likelihood information.

In certain implementations, an apparatus comprises: a digital storage medium having instructions stored thereon executable by a computing system to: check a position fix of a satellite positioning system (SPS) receiver for consistency with assistance data used to generate the position fix; and determine whether to generate a new position fix using less than all of the assistance data based, at least in part, on results of the check of the position fix.

In other implementations, an apparatus comprises: means for acquiring satellites of a satellite positioning system (SPS) using assistance data; means for computing a position fix using signals received from satellites acquired by the means for acquiring satellites; means for generating a reliability of the position fix; means for generating outlier likelihoods by comparing the position fix to elements of the assistance data; and means for determining whether to initiate a recovery procedure to compute a new position fix based, at least in part, on the outlier likelihoods.

DETAILED DESCRIPTION

Reference throughout this specification to "one implementation," "an implementation," "certain implementations," or "various implementations" means that a particular feature, structure, or characteristic described in connection with a described implementation may be included in at least one implementation of claimed subject matter. Thus, appearances of the phrase "in one example implementation," "in an example implementation," "in certain example implementations," or "in various example implementations" in various places throughout this specification are not necessarily all referring to the same implementation(s). Furthermore, particular features, structures, or characteristics may be combined in one or more implementations.

FIG. 1 is a schematic diagram illustrating an example communication arrangement 10 that may incorporate one or more positioning-related features, structures, or techniques described herein in one or more implementations. As illustrated, the communication arrangement 10 includes a mobile device 12 that may include communication functionality to support communication with one or more satellites 14, 16, 18, 20 of a satellite positioning system (SPS) and communication functionality to support communication with one or more nodes 22, 24 (e.g., base stations, access points, mobile devices, etc.) of a wireless communication system or network (e.g., wireless personal area networks (PANS), wireless local area networks (LANs), wireless municipal area networks (MANs), wireless wide area networks (WANs), wireless cellular networks, satellite communication networks, paging systems, local multipoint distribution service (LMDS) networks, multichannel multipoint distribution service (MMDSs) networks, and/or others). The mobile device 12 may include an SPS receiver (e.g., a Global Positioning System (GPS) receiver or the like) to determine a current position of the mobile device 12 based on SPS signals received from the SPS satellites 14, 16, 18, 20. In addition to an SPS receiver, mobile device 12 may also include other receivers capable of acquiring signals transmitted from terrestrial transmitters (e.g., receivers capable of acquiring signals transmitted from terrestrial transmitters in a wireless communication or broadcast signals). Here, a combination of an SPS receiver and other receivers capable of acquiring signals from terrestrial transmitters may provide a multi-functional positioning receiver as part of a positioning system. Specific example implementations for restarting a process to obtain a position fix are directed to techniques of obtaining a position fix from the acquisition of signals from a satellite at an SPS receiver. In other implementations, a process for obtaining a position fix from acquisition of different types of signals (e.g., from terrestrial transmitters) without deviating from claimed subject matter.

When the PS receiver of the mobile device 12 is activated during a user session, it may first search for and "acquire" signals to obtain measurements from a certain number of satellite or terrestrial signal sources before a position estimate, or position "fix," may be computed. Signals are then received from the acquired satellites and terrestrial sources, and the position fix is generated. The position fix may identify a position of the mobile device 12 and, in some circumstances, may also provide timing information to the mobile device 12 with respect to satellite or terrestrial time references. If the mobile device 12 has no knowledge of the positions of SPS satellites in the sky, or available terrestrial signal sources, or of time with respect to the SPS or terrestrial sources, or of its own current location, it may have to perform a laborious scan through a large range of signal frequencies and phases to acquire enough satellites and terrestrial sources for position estimation. If some of this information is available, however, even if the information is a rough estimate, it may be used to focus the search for satellites and terrestrial signal sources in a manner that can reduce acquisition time significantly. Such information may be referred to as "assistance data." By speeding up the search for signal sources, the amount of energy that is expended during the acquisition phase of the positioning process may also be reduced significantly. In a situation where energy is limited, such as in battery powered devices, this reduction in energy consumption can result in a significant increase in battery life between charges, which may be highly desirable.

Many different sources of rough location information may be available to a mobile device. For example, a mobile device that is also part of a terrestrial wireless network, such as a cellular network, may derive a rough estimate of its location using knowledge of the location of an associated base station or network access point of the wireless network. For example, with reference to FIG. 1, if the mobile device 12 is currently associated with base station 22 of a cellular wireless system, the mobile device 12 may assume that it is within the coverage area or "cell" of base station 22. This rough position information may be delivered to the corresponding PS receiver of the mobile device 12 to assist in the acquisition of satellites and other terrestrial signal sources. In another possible approach, mobile device 12 may scan the surrounding environment for signals from base stations or access points 22, 24 in the region and use these signals to calculate a rough position (e.g., using triangulation, trilateration, or some similar technique). In still another approach, mobile device 12 may use a former position estimate generated by its SPS receiver as an indication of rough position. In some implementations, a rough estimate of position may be calculated by using a previous position fix and rough knowledge of the movement of mobile device 12 since the previous fix was computed. In other scenarios, mobile device 12 may use an input value from a user to determine a rough location estimate. In another possible technique, an on-board camera or other image capture device of mobile device 12 may be used to capture images of a surrounding environment from which a rough location estimate may be implied. Many other techniques, including combinations of techniques, may be used to determine a rough location estimate of mobile device 12 for use as assistance data.

There are various sources of error in estimating position in an SPS receiver. One source, for example, is undesired cross-correlations with signals transmitted from other systems, including other satellite positioning systems. For example, a mobile device that includes a GPS receiver may experience cross-correlations with signals from a Satellite Based Augmentation System (SBAS). Similarly, a device that uses an SBAS may experience cross-correlations with a Quasi-Zenith Satellite System (QZSS), and so on. Position errors may also arise at least in part from an SPS receiver failing to acquire enough SPS signals from satellites, or from the right satellites, before computing the estimate (e.g., such as by exiting from a full sky scan too early, by failing to search for an available satellite, etc.). Another potential source of error when estimating position in an SPS receiver relates to the use of faulty or erroneous assistance data. If incorrect or faulty assistance data is used, for example, the search for satellites may be corrupted and may contribute to the acquisition of confidential wrong signals, varying from frequency side lobes, to phase cross or auto correlations, to incorrect timing assumptions (e.g. GPS msec error), to incorrect signal source identification, leading to major errors in the computed position fix. Other sources of positioning errors may also exist. Positioning errors may lead to a malfunction of corresponding location based applications which, at a minimum, may be very inconvenient for a mobile device user. Techniques are provided herein that are capable of improving the detection of position fix errors, and also improving and expediting recovery from those position fix errors.

An positioning system may generate an error estimate for a computed position fix to indicate an approximate accuracy of the fix. Such error estimates are generally presumed to represent a Gaussian or uniform distribution of possible position errors. However, there may be occasional errors well outside the normal error estimate. For example, in the case of a Gaussian distribution assumption, a 3-standard-deviation or "3-sigma" error should be usually, and a "6-sigma" level error should be very rare. However, when an error of this large magnitude, or sometimes much larger, occurs, this may be called a "position blowout", that may be defined as a state in which all or part of a positioning solution (e.g., position, time, etc.) is wrong, but there is insufficient indication that the error exists (e.g., the error estimate is much smaller than the actual error). The incorrect position or time in such a case may be referred to as a position or time "outlier." In addition to an error estimate a positioning system may generate a reliability figure for a computed position fix to indicate a reliability of the fix. Such reliability figures may represent an indication of how unlikely it is that a severe position or time error exists. While higher reliabilities do not always indicate an absence of errors, they indicate that position outliers are much less likely to occur when the reliability is higher, than when it is lower.

Figure 2:
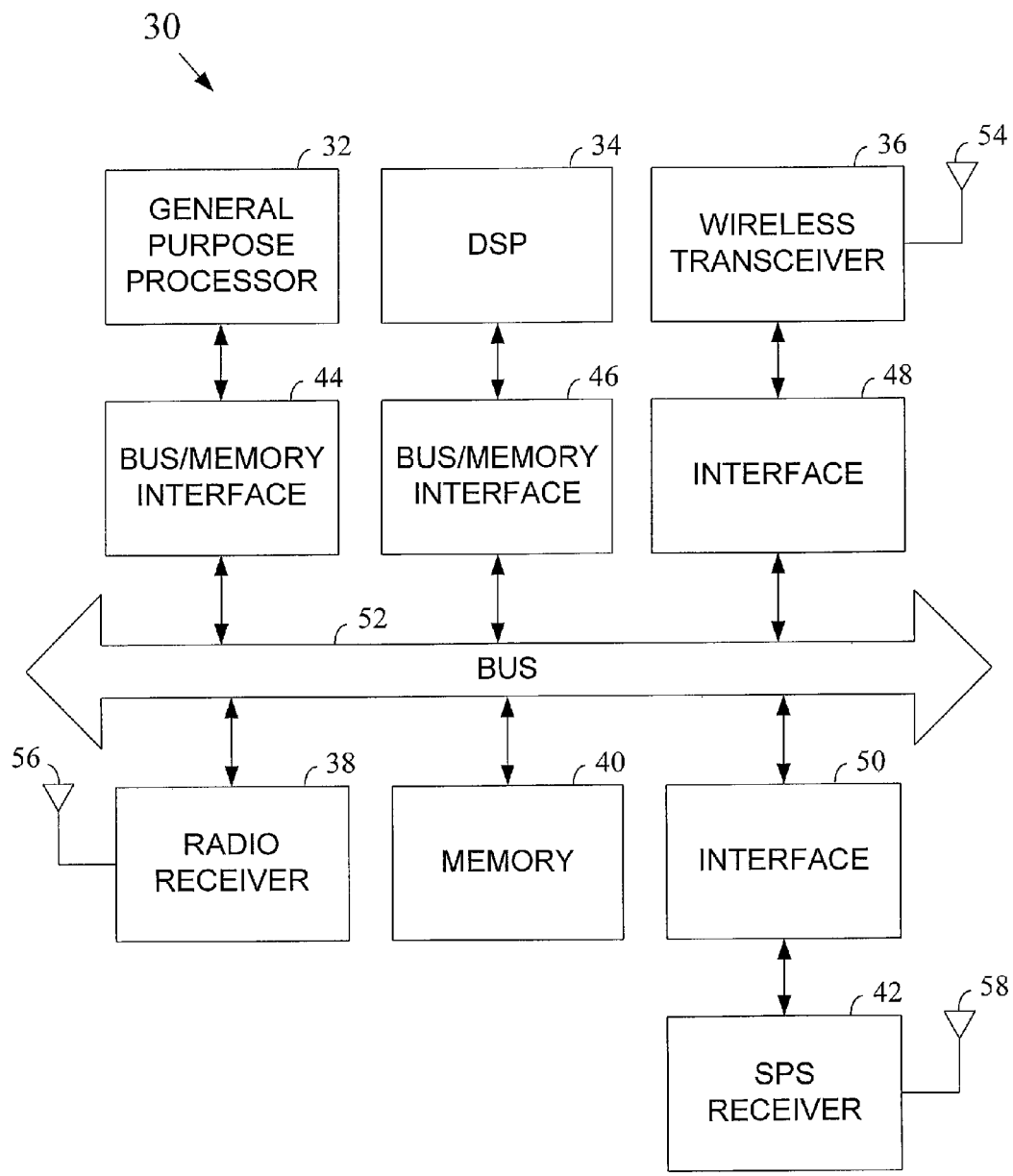
FIG. 2 is a block diagram illustrating an example mobile device architecture that may be used in an implementation.

FIG. 2 is a block diagram illustrating an example mobile device architecture 30 that may be used in an implementation. As illustrated, the mobile device architecture 30 may include, for example, a general purpose processor 32, a digital signal processor 34, a wireless transceiver 36, a radio receiver 38, a memory 40, and an SPS receiver 42. A bus 52 or other alternative structure or structures may be provided for establishing interconnections between various components of the architecture 30. In the illustrated implementation, one or more interfaces 44, 46, 48, 50 are provided between selected components and bus 52. The wireless transceiver 36, the radio receiver 38, and the SPS receiver 42 may each be coupled to one or more antennas 54, 56, 58, and/or other transducers, to facilitate the transmission and/or reception of wireless signals.

General purpose processor 32 and digital signal processor 34 may comprise digital processing devices that are capable of executing programs to provide one or more functions and/or services to a user. One or both of these processors 32, 34 may be used, for example, to execute an operating system of a corresponding wireless device. One or both of these processors 32, 34 may also be used, for example, to execute user application programs including, for example, location-based applications that may rely on an availability of an accurate position estimate. In addition, one or both of these processors 32, 34 may be used to implement, either partially or fully, one or more of the positioning related processes or techniques described herein in some implementations. It should be appreciated that other forms of digital processing devices may additionally or alternatively be used to perform some or all of the described functions in various implementations including, for example, one or more controllers, microcontrollers, application specific integrated circuits (ASICs), field programmable gate arrays (FPGAs), programmable logic arrays (PLAs), programmable logic devices (PLDs), reduced instruction set computers (RISCs), and/or others, including combinations of the above.

Wireless transceiver 36 may include any type of transceiver that is capable of supporting wireless communication with one or more remote wireless entities. In various implementations, wireless transceiver 36 may be configured in accordance with one or more wireless networking standards and/or wireless cellular standards. In some implementations, multiple wireless transceivers may be provided to support operation with different networks or systems in a surrounding environment.

During mobile device operation, wireless transceiver 36 may be called upon to communicate with a base station or access point of a wireless communication system or network. Radio receiver 38 may be operative for receiving signals from one or more sensors of a sensor network or other transmitting nodes within a surrounding environment.

Memory 40 may include any type of device or component, or combination of devices and/or components, that is capable of storing digital information (e.g., digital data, computer executable instructions and/or programs, etc.) for access by a processing device or other component. This may include, for example, semiconductor memories, magnetic data storage devices, disc based storage devices, optical storage devices, read only memories (ROMs), random access memories (RAMs), non-volatile memories, flash memories, USB drives, compact disc read only memories (CD-ROMs), DVDs, Blu-Ray disks, magneto-optical disks, erasable programmable ROMs (EPROMs), electrically erasable programmable ROMs (EEPROMs), magnetic or optical cards, and/or other digital storage suitable for storing electronic instructions and/or data.

SPS receiver 42 may include any type of receiver capable of receiving SPS signals from positioning satellites and processing the signals to provide one or more position estimates for a mobile device. SPS receiver 42 may be configured to operate with any existing or future SPS system including, for example, the Global Positioning System (GPS), the GLONASS system, the Compass system, the Galileo system, the IRNSS system, the GNSS system and other systems that use Satellite Based Augmentation Systems (SBASs) and/or Ground Based Augmentations Systems (GBASs), and/or other satellite navigation systems. In some implementations, one or more of the processes or techniques described herein may be implemented, either partially or fully, within SPS receiver 42 or a similar structure (e.g., fully or partially within a processor of SPS receiver 42). In addition to or in lieu of measurements obtained by SPS receiver 42, as discussed above, mobile device architecture 30 may also incorporate measurements obtained from acquisition of signals transmitted by terrestrial transmitters as part of an integrated positioning system. For example, measurements obtained from acquisition of wireless signals at radio receiver 38 or a receiver portion of wireless transceiver 36 may (e.g., broadcast signals or signals transmitted as part of a wireless communication system) may be used in computing a position fix. It should be appreciated that the mobile device architecture 30 of FIG. 2 represents one possible example of an architecture that may be used in a implementation. Other architectures may alternatively be used. It should also be appreciated that all or part of the various devices, processes, or methods described herein may be implemented using any combination of hardware, firmware, and/or software.

Figure 3:
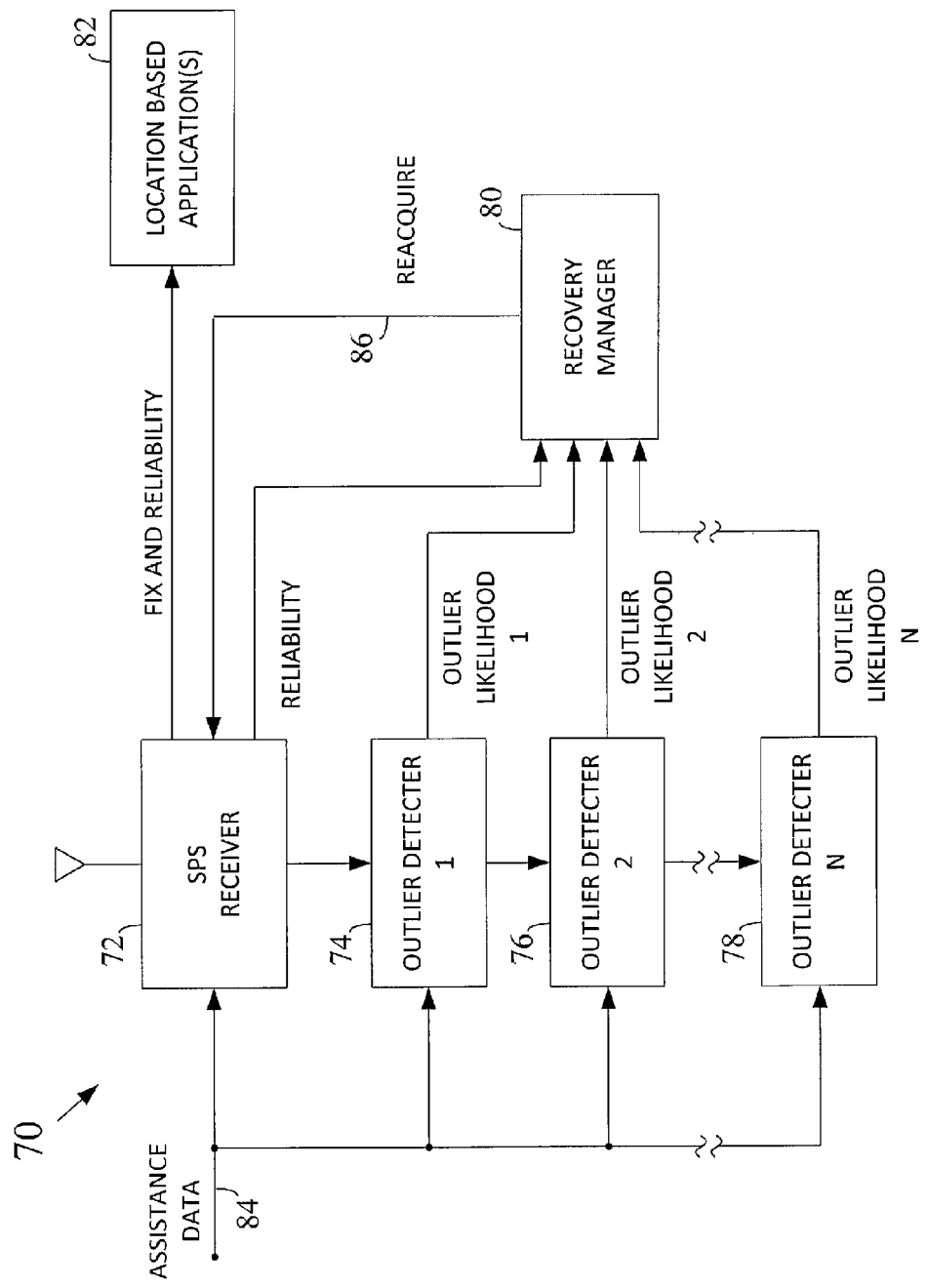
FIG. 3 is a block diagram illustrating functionality within an example mobile device in accordance with an implementation.

FIG. 3 is a block diagram illustrating functionality within an example mobile device 70 in accordance with an implementation. Mobile device 70 may utilize mobile device architecture 30 of FIG. 2 or other alternative architectures in various implementations. As illustrated, mobile device 70 may include: receiver(s) 72; a number of outlier detectors 74, 76, 78; a recovery manager 80; and one or more location-based applications 82. Receiver(s) 72 may be operative for receiving and acquiring signals (such as SPS signals from positioning satellites in an SPS system or signals transmitted from terrestrial transmitters) and using the acquired signals to compute a position fix for mobile device 70. The computed position fix may indicate an estimated position of mobile device 70 and may also include time information. As described previously, assistance data 84 may be delivered to receiver(s) 72 for use in expediting the search for and acquisition of signals transmitted by positioning satellites or terrestrial transmitters, for example. In addition to computing the position fix, receiver(s) 72 may also generate a reliability figure to indicate a reliability of the position fix. As shown in FIG. 3, receiver(s) 72 may deliver the position fix and/or the reliability figure to one or more location-based applications 82 for use thereby. As discussed previously, if there are errors in the position fix, the one or more location-based applications 82 may malfunction, which can negatively impact a user of mobile device 70. As will be described in greater detail, in some implementations, recovery manager 80 may be operative for determining whether receiver(s) 72 is(are) to perform a reacquisition of signals (e.g., from satellites or terrestrial transmitters), using less than an entirety of the assistance data previously used, to recover from an apparent error in the position fix. Reacquisition of a satellite signal using less than an entirety of the assistance data previously used may include, for example ignoring all assistance data used and restarting the acquisition process as if no assistance had been received at all, including searches which are very wide in frequency, phase and possible signals in view, searching for a single satellite, or simply searching a range of phases for a single satellite (e.g., a full 1023 PN search for GPS still with narrow frequency range to limit the search space). It should be understood, however, that these are merely examples of how a satellite may be reacquired with less than an entirety of assistance data available, and claimed subject matter is not limited in this respect.

A reliability figure generated by receiver(s) 72 may indicate how "unlikely" it is that a severe position or time outlier exists. Outlier detectors 74, 76, 78, on the other hand, may be operative for determining how "likely" it is that one or more severe outlier conditions exist. To do this, the individual outlier detectors 74, 76, 78 may compare the position fix generated by receiver(s) 72 with one or more elements of the assistance data. The comparison may be performed to determine whether an inconsistency exists that may be indicative of the existence of an outlier condition. In some implementations, different outlier detectors 74, 76, 78 may perform checks for different types of assistance data. For example, in one possible approach, outlier detector 74 may check for consistency between a position fix and an initial rough position estimate that was used as assistance data. If the position fix is very different from the rough estimate, the outlier detector 74 may generate an output indicating a high likelihood of a severe outlier condition. Similarly, outlier detector 76 may, in one approach, compare a time reference (e.g., SPS time reference) from the position fix to a time reference provided as assistance data. As above, if the values are very inconsistent, outlier detector 76 may generate an output signal indicating a high likelihood of a severe outlier condition. While specific examples of outlier detection discussed herein are directed to assessing consistency between an initial position provided in assistance data and a position fix, other types of outliers may be detected for determining whether a process for obtaining a position fix may be restarted. For example, an outlier detector 74/76/78 may be directed to assessing consistency between measured pseudorange rate (e.g., from a series of position fixes, phase change, etc.) and Doppler indications in assistance data. An outlier detector 74/76/78 may be directed to assessing consistency between an initial position and acquisition/detection of signals that are not expected to be visible/detectable in a region about the initial position. For example, if the initial position from assistance data indicates somewhere in the United States and strong signals from EGNOS (European SBAS) are detected in the absence of detections from WAAS (U.S. SBAS system), the initial position may be determined to be inconsistent with detection of signals that would suggest otherwise. In yet another implementation, an outlier detector 74/76/78 may be directed to assessing consistency between position fixes using two different methods, a first method using an initial position fix provided by assistance data and a second method that does not use the position fix. In yet another implementation, an outlier detector 74/76/78 may be directed to assessing consistency between an estimate of time obtained from an acquired signal (e.g., GPS time detected from acquisition of a GPS signal) and a time reference provided in assistance data.

Although illustrated with three outlier detectors 74, 76, 78 in FIG. 3, it should be appreciated that any number of outlier detectors may be used in different implementations. In some implementations, only a subset of the assistance data may be checked by outlier detectors. In some implementations, one or more of the outlier detectors 74, 76, 78 may also check for consistency between the position fix and information that was not used as assistance data.

As discussed above, recovery manager 80 may be operative for determining whether receiver(s) 72 is(are) to perform a reacquisition of satellites to recover from one or more apparent errors in the position fix. To make this determination, in some implementations, recovery manager 80 may analyze both the parameters generated by some or all of the outlier detectors 74, 76, 78 (e.g., outlier likelihoods, etc.) and a reliability parameter generated by receiver(s) 72. By allowing recovery manager 80 to consider both the parameters generated by the outlier detectors 74, 76, 78 and the reliability parameter of receiver(s) 72, a balance can be achieved between the two. For example, if receiver(s) 72 indicates a low reliability, and the output signals of a number of the outlier detectors 74, 76, 78 indicate a high outlier likelihood, the recovery procedure may be expedited in some implementations. During high reliability conditions, on the other hand, the outputs of the outlier detectors may be more closely scrutinized. For example, a greater number of outlier detectors 74, 76, 78 may need to indicate a high outlier likelihood during high reliability conditions to reduce the likelihood that false detections of the outlier detectors 74, 76, 78 may disrupt SPS performance. In some alternative implementations, recovery manager 80 may consider parameters generated by some or all of the outlier detectors 74, 76, 78, but not the reliability figure, to make a reacquisition determination.

If recovery manager 80 determines that an outlier exists and that recovery is desired, it may instruct receiver(s) 72 to repeat a signal acquisition procedure (using, e.g., reacquire signal 86 of FIG. 3 or the like). In some implementations, recovery manager 80 may also identify which elements of assistance data receiver(s) 72 is to use during such a reacquisition procedure. For example, the outlier likelihood information from outlier detectors 74, 76, 78 may suggest that certain items of assistance data are in error. If a decision to reacquire is made, recovery manager 80 may, in some implementations, instruct receiver(s) 72 to not use these items of assistance data during the reacquisition procedure. In an alternative approach, recovery manager 80 may instruct receiver(s) 72 to use a pre-selected subset of assistance data during the reacquisition (i.e., the same subset each time). For example, recovery manager 80 may, in some implementations, instruct receiver(s) 72 to use almanac and/or ephemeris data (or some other subset of the originally used assistance data) as assistance data during the reacquisition, but not the other assistance data. In some implementations, no assistance data will be used during a reacquisition.

Outlier detectors 74, 76, 78 may use any of a wide variety of techniques to determine corresponding outlier likelihoods (or other similar parameters). For example, in one approach, outlier detector 74 may take the distance between the positioning system's calculated position and initial position (d) and divide it by an expected offset between the two positions (initial position uncertainty+calculated position uncertainty), and compare this output to a threshold. If this initial-position-offset output is above 3 ("3-sigma"), this outlier detector may suggest an increased likelihood that there currently exists a position outlier. In another approach, operation of an SPS fault detection algorithms may be monitored, and if a significant number of measurements (e.g. two or more) are isolated from the solution, this outlier detector may also suggest an increased likelihood that there is a position outlier condition. In another approach, if signal acquisition assistance in the form of a frequency search range is provided, the frequency search range suggested may be compared to the frequency of the signal actually found. If the actually found frequency falls well outside the suggested frequency search range, this outlier detector may also suggest an increased likelihood that there is a position outlier condition. The reliability of a solution may be determined based, at least in part, on a variety of factors, including satellite count, geometric dilution of precision (GDOP), and more advanced internal and external reliability measures known in the art of satellite navigation. In one particular example, the reliability of a solution may be called "High" if eight or more pseudoranges are used in the solution, "Medium" if five to seven pseudoranges are used in the solution and "Low" if four or fewer pseudoranges are used in the solution. In an example of how the reliability of the solution may be balanced with the indicators of a potential outlier, a set of logic as follows may be used. If the reliability of the position solution is "Low", then if any of the detectors 74, 76, etc. declare a possible outlier, then recovery action may be initiated. If the reliability of the position solution is "Medium", then if at least two of the detector 74, 76, etc. declare a potential outlier, then the recovery action may be initiated. If the reliability of the position solution is "High", then if at least three of the detector 74, 76, etc. declare a potential outlier, then the recovery action may be initiated. This higher reliability position may thus be more robust against possible false detections of the outlier detector tests.

In some implementations, one or more of the outlier detectors 74, 76, 78 may have a variable threshold value that is used to determine outlier likelihoods. In at least one approach, such variable threshold values may be adjusted over time to refine an overall response of the system. For example, when a system has just begun determining positions, it may be more important to be careful as to the possibility of an outlier, so the initial position offset outlier detector, described above, may use a lower threshold, such as 2-sigma, vs. after a system has been operating for several minutes, producing position outputs, the initial position offset outlier detector may use a higher threshold, such as 5-sigma.

Although illustrated in FIG. 3 as being separate from receiver(s) 72, it should be appreciated that one or more of the outlier detectors 74, 76, 78 and/or the recovery manager 80 may be implemented as part of one or more receivers in various implementations. In some implementations, one or more of the outlier detectors 74, 76, 78 and/or the recovery manager 80 may be implemented within one or more processors of a mobile device that is(are) in communication with a local receiver. One or more of the outlier detectors 74, 76, 78 and/or the recovery manager 80 may also be implemented within a remote server that is in communication with a mobile device in some implementations. In some implementations, for example, cloud computing techniques may be used to perform some or all of the techniques and processes discussed herein.

Figure 4:
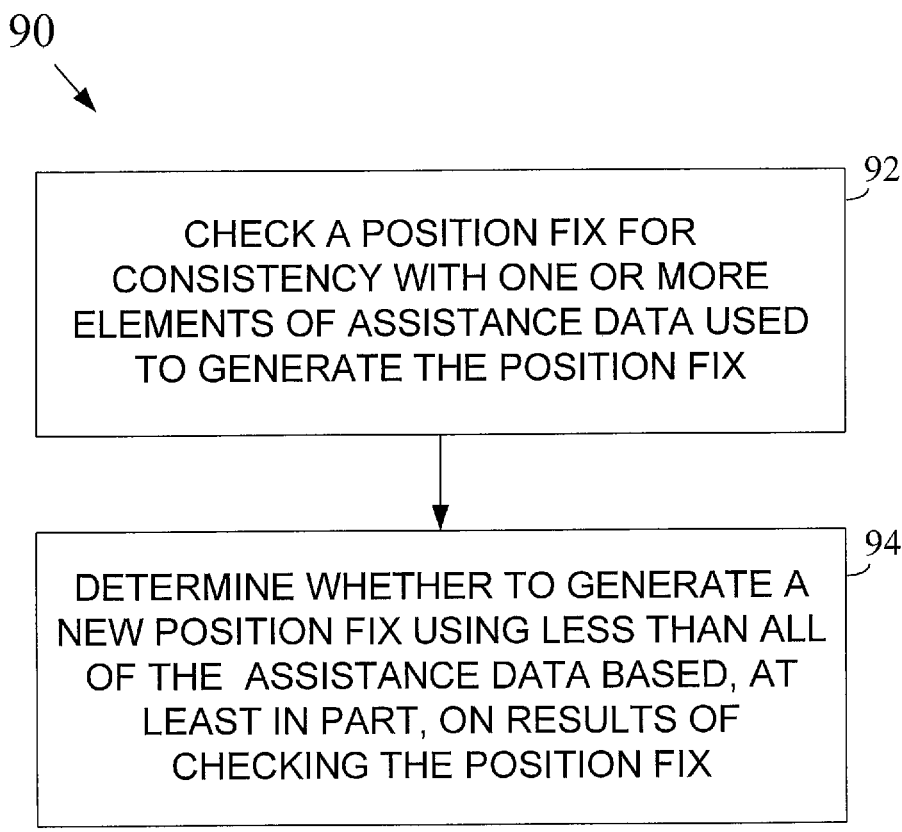
FIG. 4 is a flowchart illustrating an example method for managing positioning recovery for a mobile device operating in an SPS system in an implementation.

FIG. 4 is a flowchart illustrating an example method 90 for managing positioning recovery for a mobile device operating in a positioning system (e.g., an SPS positioning system) in an implementation. First, a position fix is checked for consistency against one or more elements of assistance data that were used to acquire satellites for use in generating the position fix (block 92). In some implementations, these checks may be performed by, for example, outlier detectors that compare the position fix to elements of assistance data. The result of one or more of the consistency checks may include, for example, information identifying a likelihood that an outlier exists given the position fix and the corresponding element of assistance data. It may subsequently be decided whether to re-acquire positioning signals and generate a new position fix using less than all of the previously used assistance data based, at least in part, on the results of checking the position fix (block 94). For example, if more than a threshold number of consistency checks produce results indicating a high outlier likelihood, it may be assumed that an outlier exists and recovery may be undertaken.

Figure 5:
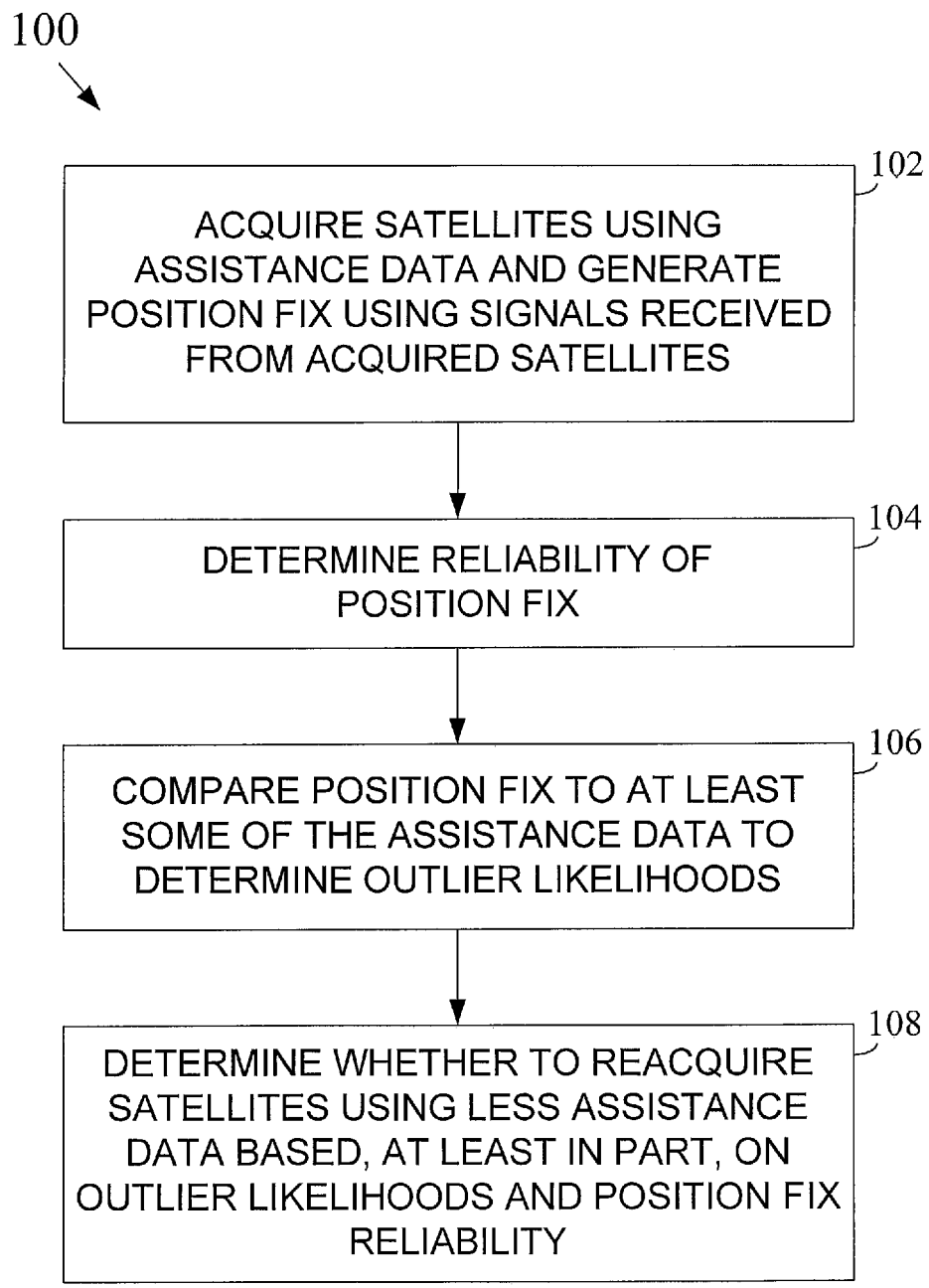
FIG. 5 is a flowchart illustrating another example method for managing positioning recovery for a mobile device operating in an SPS system in an implementation.

FIG. 5 is a flowchart illustrating another example method 100 for managing positioning recovery for a mobile device operating in an SPS system in an implementation. It should be understood, however that application of method 100 to the specific implementation of an SPS system is merely an example implementation and that aspects of method may be applied to positioning techniques based on acquisition of signals from terrestrial transmitters without deviating from claimed subject matter. A search is first performed using assistance data to acquire positioning satellites in an SPS system and a position fix is calculated using SPS signals received from acquired satellites (block 102). In one scenario, four or more satellites may be acquired. A reliability figure of the position fix may then be computed (block 104). As described previously, the reliability figure of the position fix may indicate, for example, how unlikely a severe position or time error is believed to be. The position fix may then be compared to some or all of the assistance data to determine outlier likelihoods (block 106). The outlier likelihoods may each indicate, for example, how likely an outlier is believed to be. A determination may then be made whether to reacquire satellites using less assistance data than previously used and recalculate the position fix based, at least in part, on the outlier likelihoods and the position fix reliability (block 108).

Figure 6:
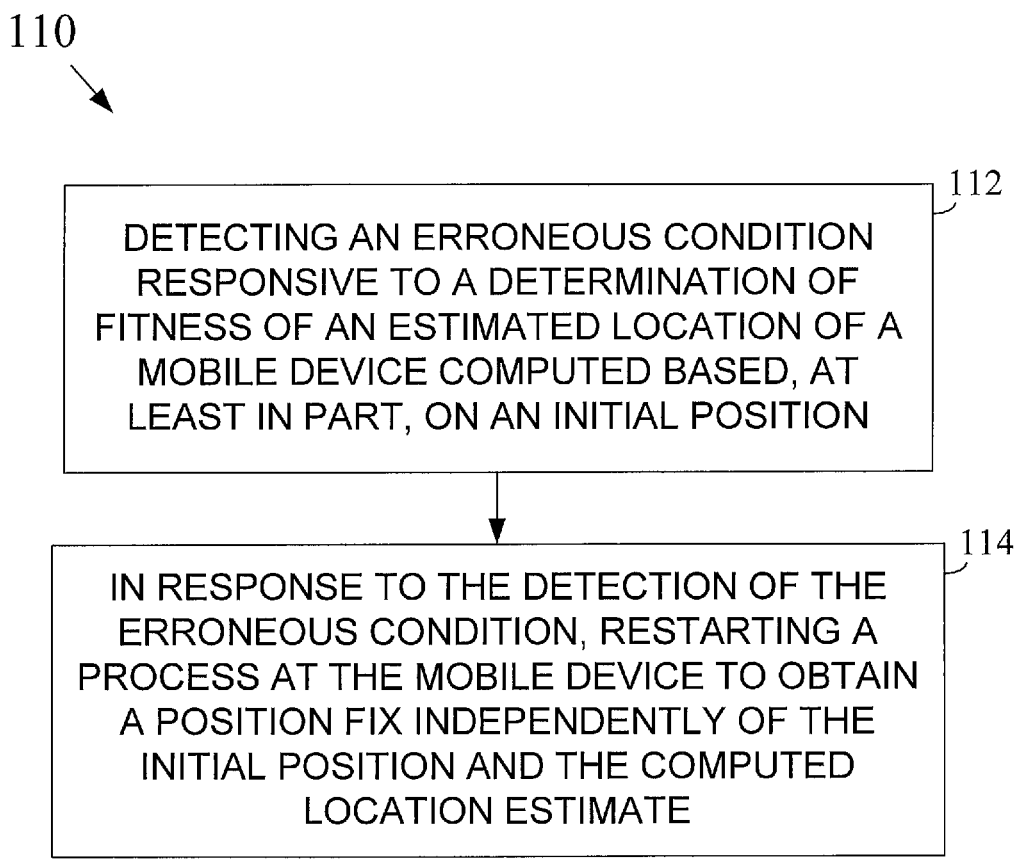
FIG. 6 is a flowchart illustrating still another example method for managing positioning recovery for a mobile device operating in an SPS system in an implementation.

FIG. 6 is a flowchart illustrating another example method 110 for managing positioning recovery for a mobile device operating in a positioning system in an implementation. An erroneous condition may be detected responsive to a determination of fitness of an estimated location of a mobile device computed based, at least in part, on an initial position (block 112). The initial position may include, for example, a position obtained from assistance data. In at least one implementation, the initial position may be obtained based, for example, on a base station ID acquired at a mobile device. The estimated location may be computed by, for example, a positioning receiver (e.g., an SPS receiver). The erroneous condition may be detected by, for example, comparing the estimated location to the initial position. In response to detection of the erroneous condition, a process may be restarted at the mobile device to obtain a position fix independently of the initial position and the computed location estimate (block 114). This may include, for example, an instruction to a receiver to generate a new position fix without using the initial position or the computed location estimate (e.g., a previous position fix). To obtain the position fix, a plurality of positioning signals may be acquired at the mobile device. Ephemeris and/or almanac information may also be used in certain implementations. In some implementations SPS positioning, a position fix may be obtained by, among other things, initiating a full sky scan to acquire one or more SPS signals.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

The methodologies described herein can be implemented by various means depending upon the application. For example, these methodologies can be implemented in hardware, firmware, software, or a combination thereof. For hardware implementations, processing may be implemented within, for example, one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, methodologies can be implemented with modules (e.g., procedures, functions, and so on) that perform functions described herein. Any machine readable digital medium tangibly embodying instructions can be used in implementing methodologies described herein. For example, software codes can be stored in a storage medium and executed by a processing unit. Storage can be implemented within a processing unit or external to a processing unit. As used herein, the terms "storage medium," "storage media," "storage device," "digital storage," or the like refer to any type of long term, short term, volatile, nonvolatile, or other storage structures and are not to be limited to any particular type of memory or number of memories, or type of media upon which data is stored.

If implemented in firmware and/or software, the functions may be stored as one or more instructions or code on a computer readable medium. Examples include computer readable media encoded with a data structure and computer readable media encoded with a computer program. Computer-readable media may take the form of an article of manufacture. Computer-readable media includes physical computer storage media. A computer readable storage medium may be any available digital medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Techniques described herein may be implemented in conjunction with various wireless communication networks such as, for example, a wireless wide area network (WWAN), a wireless local area network (WLAN), a wireless personal area network (WPAN), and so on. The terms "network" and "system" may be used interchangeably. The terms "position" and "location" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE)

network, a WiMAX (IEEE 802.16) network, and so on. A CDMA network may implement one or more radio access technologies (RATs) such as, for example, cdma2000, Wideband-CDMA (W-CDMA), and so on. Cdma2000 may include IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma 2000 is described in documents from a consortium named "3rd Generation Partnership Project 2" (3GPP2). 3GPP and 3GPP2 documents are publicly available. A WLAN may be, for example, an IEEE 802.11x network or some other type of network. A WPAN may be, for example, a Bluetooth network, an IEEE 802.15x network, or some other type of network. Techniques disclosed herein may also be implemented in conjunction with any combination of WWAN, WLAN, and/or WPAN.

As used herein, the term "mobile device" refers to a device such as a cellular telephone, smart phone, or other wireless communication device; a personal communication system (PCS) device; a personal navigation device (PND); a Personal Information Manager (PIM); a Personal Digital Assistant (PDA); a laptop computer; a tablet computer; a portable media player; or other suitable mobile or portable device which is capable of receiving wireless communication and/or navigation signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, the term "mobile device" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile device."

Designation that something is "optimized," "required," or other similar designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

In the preceding detailed description, numerous specific details have been set forth to provide a thorough understanding of claimed subject matter. However, it will be understood by those skilled in the art that claimed subject matter may be practiced without these specific details. In other instances, methods or structures that would be known by one of ordinary skill have not been described in detail so as not to obscure claimed subject matter.

Some portions of the preceding detailed description have been presented in terms of logic, algorithms, or symbolic representations of operations on binary states stored within a storage medium of a specific apparatus or special purpose computing device or platform. In the context of this particular specification, the term specific apparatus or the like may include a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "determining," "establishing," "obtaining," "identifying," "selecting," "generating," "estimating," "initializing," or the like may refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

A computer-readable storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS)

over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to particular disclosed examples, but that such claimed subject matter may also include all aspects falling within the scope of appended claims, and equivalents thereof.

What is claimed is:

1. A processor implemented method comprising:
 starting a first process to obtain a first position fix comprising an estimated location of a mobile device based, at least in part, on signals acquired from one or more satellite transmitters of a satellite positioning system utilizing one or more receivers at said mobile device, said first process comprising application of one or more assistance parameters;
 detecting an erroneous condition in a computation of said estimated location of said mobile device based, at least in part, on a comparison of said estimated location with an initial position of said mobile device;
 in response to said detection of said erroneous condition, and based, at least in part, on a computed reliability of said first position fix, starting a second process at said mobile device to obtain a second position fix based, at least in part, on one or more second satellite signals acquired from one or more satellite transmitters of said satellite positioning system utilizing said one or more receivers at said mobile device independently of application of at least a portion of said one or more assistance parameters applied in said first process to obtain said first position fix; and
 executing one or more user applications that rely on an availability of said second position fix.

2. The method of claim 1, wherein:
 said initial position is obtained from said one or more assistance parameters.

3. The method of claim 1, wherein:
 said initial position is based, at least in part, on a base station ID acquired at said mobile device.

4. The method of claim 1, wherein:
 said obtaining said first position fix further comprises obtaining said first position fix using ephemeris and/or almanac information.

5. The method of claim 1, wherein:
 said first process to obtain said first position fix comprises obtaining said first position fix based, at least in part, on said initial position of said second position mobile device; and
 said second process to obtain fix comprises initiating a full sky scan to acquire said one or more second signals from said one or more satellite transmitters of said satellite positioning system.

6. The method of claim 1, further comprising:
 determining that an outlier likelihood is greater than a second threshold.

7. The method of claim 6, wherein said computed reliability is based, at least in part, on a number of satellite signals acquired at said mobile device from different satellite transmitters of a satellite positioning system.

8. A mobile device comprising:
 a satellite positioning system (SPS) receiver to acquire SPS signals;
 a processor configured to:
  start a first process to obtain a first position fix comprising an estimated location of said mobile device based, at least in part, on one or more first SPS signals acquired at said SPS receiver and an application of one or more assistance parameters;
  detect an erroneous condition in a computation of said estimated location of said mobile device based, at least in part, on a comparison of said estimated location with an initial position of said mobile device, and based, at least in part, on a computed reliability of said first position fix;
  responsive to detecting said erroneous condition, start a second process to obtain a second position fix based, at least in part, on one or more second satellite signals acquired from one or more satellite transmitters of said satellite positioning system at said SPS receiver independently of application of at least a portion of said one or more assistance parameters applied in said first process to obtain said first position fix; and
  execute one or more user applications that rely on an availability of said second position fix.

9. The mobile device of claim 8, wherein:
 said initial position is obtained from said one or more assistance parameters.

10. The mobile device of claim 8, wherein:
 said initial position is based, at least in part, on a base station ID acquired at said mobile device.

11. The mobile device of claim 8, wherein:
 said obtaining said first position fix further comprises obtaining said first position fix using ephemeris and/or almanac information for said SPS.

12. The mobile device of claim 8, wherein:
 said first process to obtain said first position fix is comprises obtaining said first position fix based, at least in part, on said initial position of said mobile device; and
 said second process to obtain said second position fix comprises initiating a full sky scan to acquire one or more second signals from said one or more satellite transmitters of said SPS.

13. An apparatus comprising: a non-transitory medium having instructions stored thereon executable by a computing system to:

start a first process to obtain a first position fix comprising an estimated location of a mobile device based, at least in part, on signals acquired from one or more satellite transmitters of a satellite positioning system utilizing one or more receivers at said mobile device, said first process comprising application of one or more assistance parameters;

detect an erroneous condition in a computation of said estimated location of said mobile device based, at least in part, on a comparison of said estimated location with an initial position of said mobile device;

in response to said detection of said erroneous condition, and based, at least in part, on a computed reliability of said first position fix, start a second process at said mobile device to obtain a second position fix based, at least in part, on one or more second satellite signals acquired from one or more satellite transmitters of said satellite positioning system utilizing said one or more receivers at said mobile device independently of application of at least a portion of said one or more assistance parameters applied in said first process to obtain said first position fix; and execute one or more user applications that rely on an availability of said second position fix.

14. The apparatus of claim 13, wherein said initial position is obtained from said one or more assistance parameters.

15. The apparatus of claim 13, wherein said initial position is based, at least in part, on a base station ID acquired at said mobile device.

16. The apparatus of claim 13, wherein:
said obtaining said first position fix further comprises obtaining said first position fix using ephemeris and/or almanac information.

17. The apparatus of claim 13, wherein:
said first process to obtain said first position fix comprises obtaining said first position fix based, at least in part, on said initial position of said mobile device; and
said second process to obtain said second position fix comprises initiating a full sky scan to acquire said one or more second signals from said one or more satellite transmitters of said satellite positioning system.

18. An apparatus comprising:
means for starting a first process to obtain a first position fix comprising an estimated location of a mobile device based, at least in part, on signals acquired from one or more satellite transmitters of a satellite positioning system utilizing one or more receivers at said mobile device, said first process comprising application of one or more assistance parameters;

means for detecting an erroneous condition in a computation of said estimated location of said mobile device based, at least in part, on a comparison of said estimated location with an initial position of said mobile device;

means for starting a second process at said mobile device to obtain a second position fix based, at least in part, on one or more second satellite signals acquired from one or more satellite transmitters of said satellite positioning system utilizing said one or more receivers at said mobile device independently of application of at least a portion of said one or more assistance parameters applied in said first process to obtain said first position fix, said second process to be started in response to said detection of said erroneous condition and based, at least in part, on a computed reliability of said first position fix; and means for executing one or more user applications that rely on an availability of the second position fix.

19. The apparatus of claim 18, wherein:
said initial position is obtained from said one or more assistance parameters.

20. The apparatus of claim 18, wherein:
said initial position is based, at least in part, on a base station ID acquired at said mobile device.

21. The apparatus of claim 18, wherein:
said means for starting said first process further comprises:
means for obtaining said first position fix using ephemeris and/or almanac information.

22. The apparatus of claim 18, wherein:
said means for starting said first process to obtain said first position fix comprises means for obtaining said first position fix based, at least in part, on said initial position of said mobile device; and
said means for starting said second process to obtain said second position fix further comprises:
means for initiating a full sky scan to acquire said one or more second signals from said one or more satellite transmitters of said satellite positioning system.

23. A processor implemented method comprising:
starting a first process to obtain, from positioning assistance parameters, a first position fix comprising a time reference at a mobile device based, at least in part, on one or more first satellite signals acquired from one or more satellite transmitters of a satellite positioning system utilizing one or more receivers at said mobile device, said first process comprising application of one or more assistance parameters;

detecting an erroneous condition in a computation of said time reference at said mobile device based, at least in part, on a comparison of a time observed from acquisition of one or more positioning signals and said time reference obtained from said positioning assistance parameters;

in response to said detection of said erroneous condition, and based, at least in part, on a computed reliability of said first position fix, starting a second process at said mobile device to obtain a second position fix based, at least in part, on one or more second satellite signals acquired from one or more satellite transmitters of said satellite positioning system utilizing said one or more receivers at said mobile device independently of application of at least a portion of said one or more assistance parameters applied in said first process to obtain said first position fix; and executing one or more user applications that rely on an availability of the second position fix.

24. A processor implemented method comprising:
starting a first process to obtain, from positioning assistance parameters, a first position fix comprising a location estimate of a mobile device based, at least in part, on one or more first satellite signals acquired from one or more satellite transmitters of a satellite positioning system utilizing one or more receivers at said mobile device, said first process comprising application of one or more assistance parameters;

detecting an erroneous condition responsive to an evaluation of a consistency of parameters observed from acquisition of from said one or more satellite transmitters of said satellite positioning system and an initial position obtained from said positioning assistance parameters;

in response to said detection of said erroneous condition, and based, at least in part, on a computed reliability of said first position fix, starting a second process at said mobile device to obtain a second position fix based, at least in part, on one or more second satellite signals acquired from one or more satellite transmitters of said satellite positioning system utilizing said one or more receivers at said mobile device independently of application of at least a portion of said one or more assistance parameters applied in said first process to obtain said first position fix; and executing one or more user applications that rely on an availability of the second position fix.

25. A processor implemented method comprising:

starting a first process to obtain a first plurality of position fixes comprising a plurality of estimated locations of a mobile device based, at least in part, on one or more first satellite signals acquired from one or more satellite transmitters of a satellite positioning system utilizing one or more receivers at said mobile device, said first process comprising application of one or more assistance parameters;

detecting an erroneous condition responsive to an evaluation of a consistency of a speed of said mobile device based, at least in part, on said first plurality of position fixes and Doppler indications obtained from positioning assistance parameters;

in response to said detection of said erroneous condition, and based, at least in part, on a computed reliability of said first plurality of position fixes, starting a second process at said mobile device to obtain a second plurality of position fixes based, at least in part, on one or more second satellite signals acquired from one or more satellite transmitters of said satellite positioning system utilizing said one or more receivers at said mobile device independently of application of at least a portion of said one or more assistance parameters applied in said first process to obtain said first plurality of position fixes; and executing one or more user applications that rely on an availability of said second plurality of position fixes.

* * * * *